United States Patent
Berner et al.

(10) Patent No.: US 9,400,138 B2
(45) Date of Patent: Jul. 26, 2016

(54) MELTING REDUCTION ASSEMBLY AND METHOD FOR OPERATING A MELTING REDUCTION ASSEMBLY

(75) Inventors: Franz Berner, Asten (AT); Jan-Friedemann Plaul, Linz (AT); Kurt Wieder, Schwertberg (AT); Johann Wurm, Bad Zell (AT)

(73) Assignee: PRIMETALS TECHNOLOGIES AUSTRIA GMBH (AT)

(*) Notice: Subject to any disclaimer, the term of this patent is extended or adjusted under 35 U.S.C. 154(b) by 238 days.

(21) Appl. No.: 14/233,304

(22) PCT Filed: Jun. 13, 2012

(86) PCT No.: PCT/EP2012/061159
§ 371 (c)(1),
(2), (4) Date: Jan. 16, 2014

(87) PCT Pub. No.: WO2013/010725
PCT Pub. Date: Jan. 24, 2013

(65) Prior Publication Data
US 2014/0138883 A1    May 22, 2014

(30) Foreign Application Priority Data
Jul. 21, 2011   (AT) .................. 1071/2011

(51) Int. Cl.
*F27D 3/00*    (2006.01)
*C21B 7/16*    (2006.01)
(Continued)

(52) U.S. Cl.
CPC .............. *F27D 3/0025* (2013.01); *C21B 7/163* (2013.01); *C21B 13/002* (2013.01); *C21B 13/143* (2013.01); *F27B 1/16* (2013.01); *F27D 3/16* (2013.01); *Y02P 10/136* (2015.11)

(58) Field of Classification Search
CPC .......... C21B 13/002; C21B 7/163; F27B 1/16
USPC .......................................... 266/44, 268, 199
See application file for complete search history.

(56) References Cited

U.S. PATENT DOCUMENTS

| 4,725,308 A | 2/1988 | Kepplinger |
| 4,846,449 A | 7/1989 | Hauk et al. |

(Continued)

FOREIGN PATENT DOCUMENTS

| CN | 1263563 A | 8/2000 |
| CN | 201443953 U | 4/2010 |

(Continued)

OTHER PUBLICATIONS

International Search Report dated Sep. 28, 2012 issued in corresponding International patent application No. PCT/EP2012/061159.

(Continued)

*Primary Examiner* — Scott Kastler
(74) *Attorney, Agent, or Firm* — Ostrolenk Faber LLP

(57) ABSTRACT

A melting reduction assembly (1) has a melting gasification zone, including a packed bed (4) formed by solid carbon carriers and ferrous input materials, the zone has a lower section for receiving liquid pig iron (6) or raw steel material and liquid slag (7), a tap (9) for liquid slag and liquid pig iron. A plurality of oxygen nozzles (5) supplies oxygen. The nozzles are in at least two nozzle planes arranged spaced apart from each other and parallel in the vertical direction and horizontally distributed over the circumstances of the shell (10) of the melting reduction assembly (1) and arranged offset to each other in their respective nozzle planes.

13 Claims, 3 Drawing Sheets

(51) Int. Cl.
*C21B 13/00* (2006.01)
*C21B 13/14* (2006.01)
*F27B 1/16* (2006.01)
*F27D 3/16* (2006.01)

(56) References Cited

U.S. PATENT DOCUMENTS

| | | | |
|---|---|---|---|
| 5,131,942 A * | 7/1992 | Katayama | C22B 5/10 |
| | | | 75/414 |
| 6,213,762 B1 | 4/2001 | Eichberger et al. | |
| 2010/0294080 A1 * | 11/2010 | Kepplinger | C21B 5/003 |
| | | | 75/543 |
| 2011/0272868 A1 | 11/2011 | Simoes et al. | |
| 2014/0138883 A1 * | 5/2014 | Berner | C21B 7/163 |
| | | | 266/44 |

FOREIGN PATENT DOCUMENTS

| | | |
|---|---|---|
| DE | 37 37 271 A1 | 7/1988 |
| DE | 20 2010 008866 U1 | 12/2010 |
| EP | 0 143 102 A1 | 5/1985 |
| EP | 0 297 167 A1 | 1/1989 |
| JP | 63 153208 | 6/1988 |
| UA | 92127 | 9/2010 |
| WO | WO 99/04045 A1 | 1/1999 |
| WO | WO 01/14599 A1 | 3/2001 |

OTHER PUBLICATIONS

International Preliminary Report on Patentability dated Oct. 25, 2013 issued in corresponding International patent application No. PCT/EP2012/061159.
Notice of Grant issued in counterpart Ukraine patent application No. 2014-00532 date Aug. 20, 2015.

* cited by examiner

MELTING REDUCTION ASSEMBLY AND METHOD FOR OPERATING A MELTING REDUCTION ASSEMBLY

CROSS-REFERENCE TO RELATED APPLICATIONS

The present application is a 35 U.S.C. §§371 national phase conversion of PCT/EP2012/064648, filed Jul. 26, 2012, which claims priority of European Patent Application No. 11176837.0, filed Aug. 8, 2011, the contents of which are incorporated by reference herein. The PCT International Application was published in the German language.

FIELD OF THE INVENTION

The invention relates to a melting reduction assembly having loading devices for solid carbon carriers such as pieces of coal, and ferrous input materials such as partly reduced and/or fully reduced sponge iron, having a melting gasification zone which comprises a packed bed formed by the solid carbon carriers and the ferrous input materials, having a lower section for receiving liquid pig iron or raw steel material and liquid slag, having a tap for liquid slag and liquid pig iron, having a plurality of oxygen nozzles arranged in the shell of the melting reduction assembly and supply lines for feeding oxygen to the oxygen nozzles, in particular a ring circuit which surrounds the shell of the melting reduction assembly in a ring form and from which oxygen-containing gas can be fed via gas lines to the oxygen nozzles.

The invention also relates to a method for operating a melting reduction assembly.

BACKGROUND OF THE INVENTION

It is known from the prior art, for example WO 01/14599 A1, to arrange a plurality of oxygen nozzles at the periphery of a melting reduction assembly. In this way, it is possible to form a CO-containing and $H_2$-containing reducing gas in a packed bed made from solid carbon carriers and ferrous input materials in the melting reduction assembly. However, in this type of arrangement of oxygen nozzles, the number of oxygen nozzles and therefore the maximum achievable melt output or pig iron production level is limited.

In melting reduction methods such as COREX and FINEX which have a melting reduction assembly, in particular a melter-gasifier, oxygen nozzles are installed at the periphery between the hearth and the char bed (packed bed, carbon bed) in order to blow in the oxygen as evenly as possible at the periphery for the gasification of carbon in order to form the reducing gas and to provide the required energy. It is also known to blow in fine coal via the oxygen nozzles in order to reduce the coal usage, in particular the use of pieces of coal or coal bricks.

Operating results have revealed that the melt output per oxygen nozzle is limited since both too much gas and too much liquid pig iron and liquid slag being formed can bring about insufficient permeability in front of and/or below and/or above the oxygen nozzle plane. This results in greater demands being placed on the raw materials used, so that suitable packed bed stability can nevertheless be achieved or secured. A further consequence is the limitation of the fine coal injection because this measure can also have a permeability-reducing effect, so that process faults, for example, limitation of the output or quality variations can be the result. Furthermore, insufficient drainage of the fluid phases (e.g. pig iron, slag) can also result in nozzle damage.

Previous operating results of systems of this type have shown that a relationship between the frequency of nozzle damage and the melt output per nozzle is probable. It has also been found that the fine coal quantity that can be blown in per nozzle is limited.

Different approaches to solutions have taken account of variations of the nozzle geometries. However, the results have so far not been satisfactory, particularly in systems with high pig iron production levels.

Development plans also exist which aim at a larger pig iron production level. Previously known arrangements of the oxygen nozzles in a nozzle plane and at the periphery of a melting reduction assembly lead, due to the size of the nozzle supports and the required thicknesses of the sheet metal in the gasifier metal shell between the nozzle supports, to a smaller number of oxygen nozzles and therefore to systems with output limitations or to process faults and reduced availability on account of nozzle faults.

Furthermore, an increase in the output of the melting reduction assembly can be achieved through an increase in the hearth area, that is, the inner cross-section of the melting reduction assembly, wherein the periphery does not increase to the same extent, so that limitations also arise in this regard.

SUMMARY OF THE INVENTION

It is therefore an object of the invention to provide a melting reduction assembly and a method for operating a melting reduction assembly which enables a greater pig iron production with simultaneously reliable operation.

This object is achieved, according to the invention, by a plurality of oxygen nozzles which are arranged in at least two nozzle planes arranged spaced apart from one another, in particular in the vertical direction, and arranged parallel to one another, said nozzles being horizontally distributed round the periphery of the shell of the melting reduction assembly. In addition, the nozzles of the different nozzle planes are arranged offset relative to one another. The oxygen nozzles can be used to apply technically pure oxygen or oxygen-rich gases, for example, oxygen-enriched air.

Melting reduction assemblies serve for the manufacturing of liquid pig iron or liquid raw steel materials. Starting from the ferrous input materials and coal or coke, the ferrous input materials are reduced to pig iron and melted. This is carried out in a packed bed comprising coal or coke and the ferrous input materials. An example of known melting reduction assemblies are melter-gasifiers. A blast furnace, in particular a blast furnace operable with gases having a high oxygen content can also be used, in which the formation of liquid pig iron and slag from a packed bed takes place.

With the arrangement of oxygen nozzles in two or more nozzle planes, the number of nozzles that can possibly be arranged in the melting reduction assembly is able to be increased or maximized.

In order to be able to increase the pig iron production per melting reduction assembly, the problem of process faults and frequent nozzle damage must first be solved, because greater pig iron production also requires a higher level of melt output per nozzle. The increase in the frequency of nozzle damage is related to the fact that with a higher melt output per nozzle, the pig iron and slag flows increase and these, in turn, can lead to damage to, or faults in, the nozzles.

The oxygen nozzles can be equally distributed around the periphery of the shell of the melting reduction assembly, wherein an arrangement of the oxygen nozzles in groups distributed around the periphery can also be provided. The oxygen nozzles of one group could then be controlled together, for example.

According to the invention, through the arrangement of the oxygen nozzles in at least two nozzle planes, the number of oxygen nozzles can be increased and thus the melt output per oxygen nozzle can be reduced. With the offset arrangement of the oxygen nozzles over at least two nozzle planes, mutual impairment of, or damage to, the oxygen nozzles in the nozzle planes can be prevented. The arrangement of the nozzles of two nozzle planes directly over one another would have the result that oxygen nozzles arranged above would be damaged by the gas stream from oxygen nozzles lying therebelow. The danger also exists that the lower oxygen nozzles could be impaired or even damaged by the pig iron flow and slag flow from oxygen nozzles lying therebelow. With the inventive arrangement, it is possible to increase the number of oxygen nozzles and thus the overall melt output of the melting reduction assembly without the risk of greater nozzle damage which would have the consequence of the reduced usability of the system. The nozzle planes are arranged parallel to one another so that the nozzle planes are arranged perpendicular to the typically vertical axis of the melting reduction assembly. In addition, the nozzle planes are arranged such that the oxygen nozzles are situated in the region of the packed bed which is formed in the melting reduction assembly.

According to an advantageous embodiment of the inventive melting reduction assembly, the vertical spacing between the nozzle planes, in particular the vertical spacing between the exit openings of the oxygen nozzles, is smaller or at most equal to the horizontal spacing between the nozzles. The smallest possible spacing of the nozzle planes has the advantage that mutual damaging of the nozzles is prevented. Advantageously, the smallest possible spacing is to be set between the nozzle planes. This can be achieved, for example, with an increased horizontal spacing between the nozzles. In particular, what is important herein is the spacing between the exit points of the oxygen from the oxygen nozzles in the interior of the melting reduction assembly.

According to another possible embodiment of the inventive melting reduction assembly, at least one of the nozzles has an inclination angle of the nozzle axes relative to the horizontal in particular in the range of 0° to 16°, preferably 4° to 12°, directed downwardly.

Due to the downwardly directed inclination of the nozzle axes, a gas bubble, which is designated a "raceway", forms in front of the oxygen nozzle and, compared to the oxygen emergence from the oxygen nozzle, lies deeper than in the case of a horizontal nozzle axis. Thus, the level of the liquids (e.g. pig iron, slag) forming in this region lies in the gas bubble and is therefore deeper than the oxygen nozzle so that damage to the oxygen nozzle can be almost precluded, since the oxygen is not blown directly into the liquid and therefore no bubbles are formed in the liquid.

An advantageous embodiment of the inventive melting reduction assembly provides that at least two of the nozzles which are arranged at two different nozzle planes have different, in particular downwardly directed, inclinations of the nozzle axes. It is therefore possible to define the raceways which form with regard to the position thereof relative to the oxygen nozzles and, optionally, to adapt said raceways to the oxygen quantities.

According to the invention, at least one nozzle of a nozzle plane has a smaller inclination of the nozzle axis relative to the horizontal, in particular in the range of 0° to 15°, than a nozzle of a nozzle plane lying thereabove, in particular in the range of 6° to 25°. By adjusting the inclination angle between the nozzle planes, an overall homogenous melt output of the oxygen nozzles can be set and mutual negative influencing of the oxygen nozzles can be prevented through the smallest possible vertical spacing in the interior of the melting reduction assembly. It is also possible, in particular, to adapt the inclination angle of the oxygen nozzles used, for example, for the injection of fine coal.

According to a special embodiment of the inventive melting reduction assembly, all the oxygen nozzles of one nozzle plane have the same, particularly downwardly directed, inclination of the nozzle axis relative to the horizontal. The uniform orientation of the oxygen nozzles has the advantage that mounting elements, for example nozzle supports, can be configured identical. Furthermore, a largely even melt output can be achieved over the periphery of the melting reduction assembly.

A particularly advantageous embodiment of the inventive melting reduction assembly provides that all the oxygen nozzles are arranged such that the gas stream and/or fluid flow emerging from the oxygen nozzles or formed by the oxygen do not overlap one another. During operation of the oxygen nozzles, firstly, gas streams and, secondly, pig iron and slag flows are produced. These streams and flows must not cause any damage to the other oxygen nozzles and must not overlay or influence one another. Based on the known operating parameters, the oxygen nozzles can be arranged such that, no overlaying or overlapping or mutual influencing arises within the operating parameter range.

Slight overlapping of the gas and/or liquid streams can be allowed without any nozzle damage resulting therefrom. This can also be set by means of operating tests.

According to an advantageous embodiment of the inventive assembly, the arrangement of the oxygen nozzles in at least two nozzle planes and the inclination of the nozzle axes is selected such that a minimum vertical spacing is set between the nozzle tips. As a result of the minimum spacing of the nozzle tips, the risk of mutual damaging of the oxygen nozzles can also be reduced. The points of the oxygen nozzles at which the oxygen emerges from the oxygen nozzles, are positioned as closely as possible to one another and mutual damage is thereby precluded.

The object is further achieved by the inventive method in that the supply of oxygen-containing gas or of oxygen into the melting reduction assembly is carried out via the oxygen nozzles which are arranged in at least two nozzle planes arranged spaced apart from one another, in particular in the vertical direction, and arranged parallel to one another, said nozzles being horizontally distributed around the periphery of the shell of the melting reduction assembly and wherein the oxygen nozzles of different nozzle planes are arranged offset relative to one another. With the advantageous arrangement, the number of oxygen nozzles can be increased and the pig iron production can be significantly increased without the need to accept the risk of a lower availability of the method. Due to the inventive arrangement, the oxygen nozzles can be operated at reduced melt output per oxygen nozzle, so that the availability or the probability of nozzle faults is also reduced.

Advantageously, the gas streams and/or fluid flows emerging from the oxygen nozzles and the gas streams and/or fluid flows formed by the oxygen-containing gas or the oxygen do not overlap one another. It is thus ensured, during operation, that no nozzle damage is caused and an optimum melt output is achieved. This is particularly relevant when fine coal is fed in via the oxygen nozzles since, in this way, coal can be saved without reducing the quantity of pig iron.

With the oxygen nozzles arranged over one another, the fluid formed at an upper oxygen nozzle flows over the lower oxygen nozzle and additionally burdens or overburdens the packed bed in front of the oxygen nozzle since the amount of gaps in the packed bed is insufficient for drainage, so that fluid backs up in this region. The gas from the lower oxygen nozzle streams past the upper oxygen nozzle. Both can lead to huge process faults and increased nozzle damage. With an offset arrangement, under certain circumstances, similar negative effects can still occur. Where the lower oxygen nozzles are arranged inclined and the upper nozzles are arranged between the lower oxygen nozzles and more strongly inclined relative thereto, a smaller vertical spacing is produced, so that the streams/flows of fluids and of gases no longer cause mutual interference between the oxygen nozzles.

According to the invention, the quantity of oxygen introduced via the oxygen nozzles arranged in at least two nozzle planes is set such that the gas streams and/or fluid flows which form do not make contact with the oxygen nozzles. As a consequence of the inventive arrangement of oxygen nozzles and the specific melt output resulting from the overall number of oxygen nozzles and thus from the specific oxygen quantity per oxygen nozzle, firstly the nozzle arrangement and the gas steams or the pig iron and slag flows can be matched to one another so that the oxygen nozzles are not damaged or limited in the operation thereof. The gas streams and/or fluid flows of an oxygen nozzle of one nozzle plane may only influence the oxygen nozzles of another nozzle plane to the extent that no process faults or nozzle damage occurs. A further positive effect is produced in that the gas stream from the upper nozzle plane deflects the gas stream from the lower plane more strongly toward the middle of the melting reduction assembly and thereby increases the active cross-section of the packed bed. Lower gas speeds resulting therefrom lead to a more stable operation. In the peripheral direction, the energy input is better distributed due to the higher possible nozzle count and the inactive region between the nozzles is reduced, so that improved gas distribution, lower local gas speeds, a better distribution of the fluids and, as a result, an increase in output in respect of the pig iron quantity, and improved process stability and product quality are achieved.

BRIEF DESCRIPTION OF THE DRAWINGS

The invention will now be described by reference to FIGS. 1, 2 and 3 as examples, but without restriction thereto.

FIG. 3A shows the locations of the nozzle outlets both in different planes and at selected distances apart on a plane;

FIG. 3B is a side view of the nozzle locations and spacing.

FIG. 3C illustrates the flows of the outlets of the nozzle of FIG. 3B.

MODES FOR CARRYING OUT THE INVENTION

Figure 1:
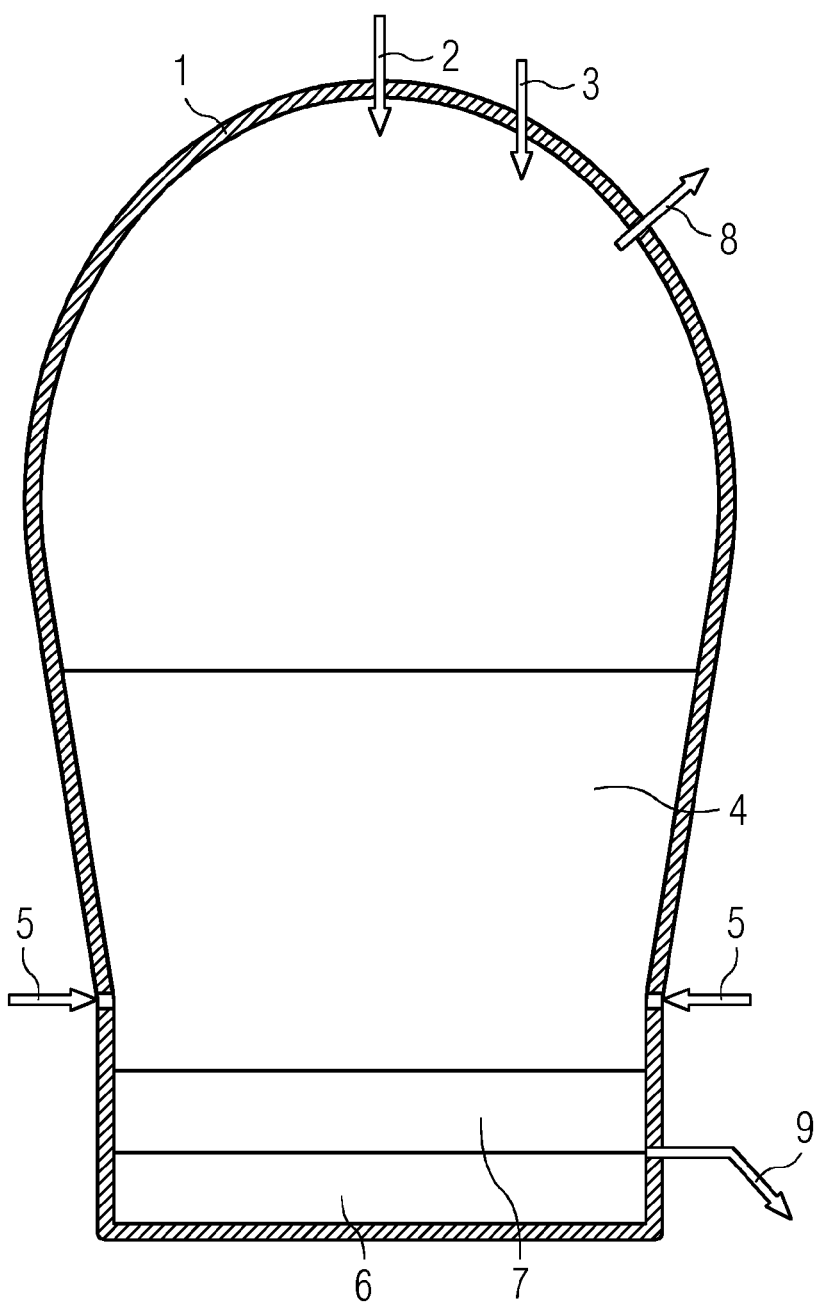
FIG. 1 is a vertical section through a melting reduction assembly configured as a melter-gasifier.

FIG. 1 shows a vertical section through a melting reduction assembly configured as a melter-gasifier 1 to which solid carbon carriers 2 and ferrous input materials 3 are fed from above by means of loading devices. The carbon carriers 2 are preferably provided as pieces of coal and/or coke and/or coal bricks, whilst the ferrous input materials are preferably made of sponge iron in a partly reduced and/or fully reduced form, in pieces and/or fine particulate form.

Arranged before the melter-gasifier 1 is/are typically one or more reduction assemblies (not shown), for example, direct reduction shafts or fluidized bed assemblies in which iron oxide-containing material is reduced to the partly or fully reduced sponge iron by means of the reducing gas generated in the melter-gasifier 1. Said sponge iron is conveyed out of the reduction shaft and passed to the melter-gasifier 1. The melting reduction assembly can be configured as a blast furnace. Herein, the reduction zone and the melting zone are arranged within one assembly so that the melting reduction assembly is formed by the lower part of the blast furnace, whilst the pre-reduction takes place in the upper part of the blast furnace.

In the melting gasification zone of a melter-gasifier 1, a packed bed 4 is formed from the solid carbon carriers 2. In a blast furnace, a packed bed also forms in the region of the oxygen nozzles. In this packed bed 4, an oxygen-containing gas, preferably industrial oxygen or oxygen-containing gases, is blown in via oxygen nozzles 5. The ferrous input materials 3 are melted to liquid pig iron 6 and liquid slag 7 with simultaneous formation of a reducing gas. The reducing gas formed is drawn via a reducing gas removal line 8 out of the melter-gasifier 1.

Liquid pig iron 6 and liquid slag 7 collect in a lower section of the melter-gasifier 1 and are drawn off via a tap 9. Oxygen or oxygen-containing gas is initially fed in via a feed line (not shown), for example, via a circular ring circuit surrounding the melter-gasifier 1. In a similar manner, a blast furnace is supplied via a ring circuit. The oxygen nozzles 5 can be supplied from the feed line via gas lines (not shown).

The oxygen nozzles 5 are arranged in the outer region of the shell of the melter-gasifier 1 and are connected via a bore channel to the interior of the melter-gasifier 1. Starting from the tap 9, the position of which is usually defined by the height of the pouring bay and the channels for transporting away the pig iron and the slag, the "hearth height" (spacing between the tap 9 and the oxygen nozzles 5) is thereby defined. This region serves for storing the liquids produced (pig iron and slag) and for the metallurgical reactions to take place. Arranged above the oxygen nozzles 5 are the gas-permeated carbon bed (fluid packed bed) as far as the dome which provides a gas chamber for conditioning.

Figure 2:
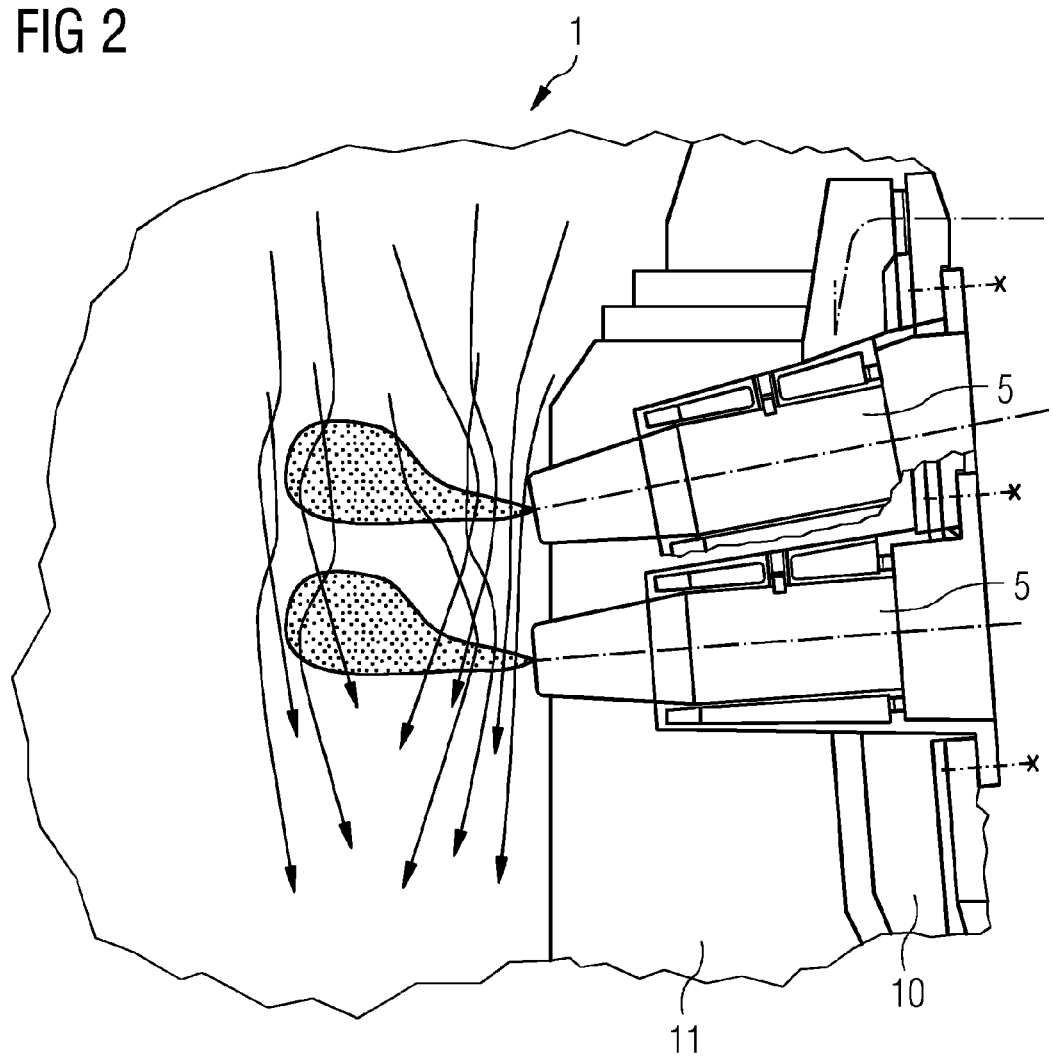
FIG. 2 is a portion of a view of the oxygen nozzles in the assembled state.

FIG. 2 shows a schematic representation of the arrangement of oxygen nozzles 5 in a melter-gasifier 1, wherein the oxygen nozzles 5 are arranged in the shell 10 of the melter-gasifier 1. The nozzle supports which serve to mount the oxygen nozzles 5 at the shell of the melter-gasifier 1 are only schematically indicated here. The oxygen nozzles 5 extend through a fireproof layer 11 (indicated) into the processing chamber of the melter-gasifier 1. The nozzle supports can also be configured with a different inclination from that of the oxygen nozzle axes. This can be seen in relation to the inclination of the shell of the melter-gasifier 1 or of a blast furnace. For example, a shell inclination of 8° and an inclination of the nozzle axis of also 8° can be used in order to enable a configuration of the sealing seatings and conical seatings with rotational symmetry, for mounting of the oxygen nozzles and the nozzle supports in the shell of the assembly. However, solutions without rotational symmetry are also useful with certain shell geometries.

The oxygen nozzles 5 are arranged in two nozzle planes situated one above the other, but horizontally offset to one another, so that no oxygen nozzle 5 is arranged directly above an oxygen nozzle 5 situated therebelow. The oxygen and possibly also fine carbon carriers, for example, coal dust or fine coal are introduced via the oxygen nozzles 5 into the melter-gasifier 1 and the packed bed 4 present there, which consists of pieces of carbon carriers. The oxygen quantity necessary for operation of the melter-gasifier 1 is thus introduced so that the required energy is provided, the coal is gasified and a reducing gas is thereby formed. For each oxygen nozzle 5, a melt output is therefore brought about so that a pig iron flow, a slag flow and a gas stream are formed.

Figure 3:
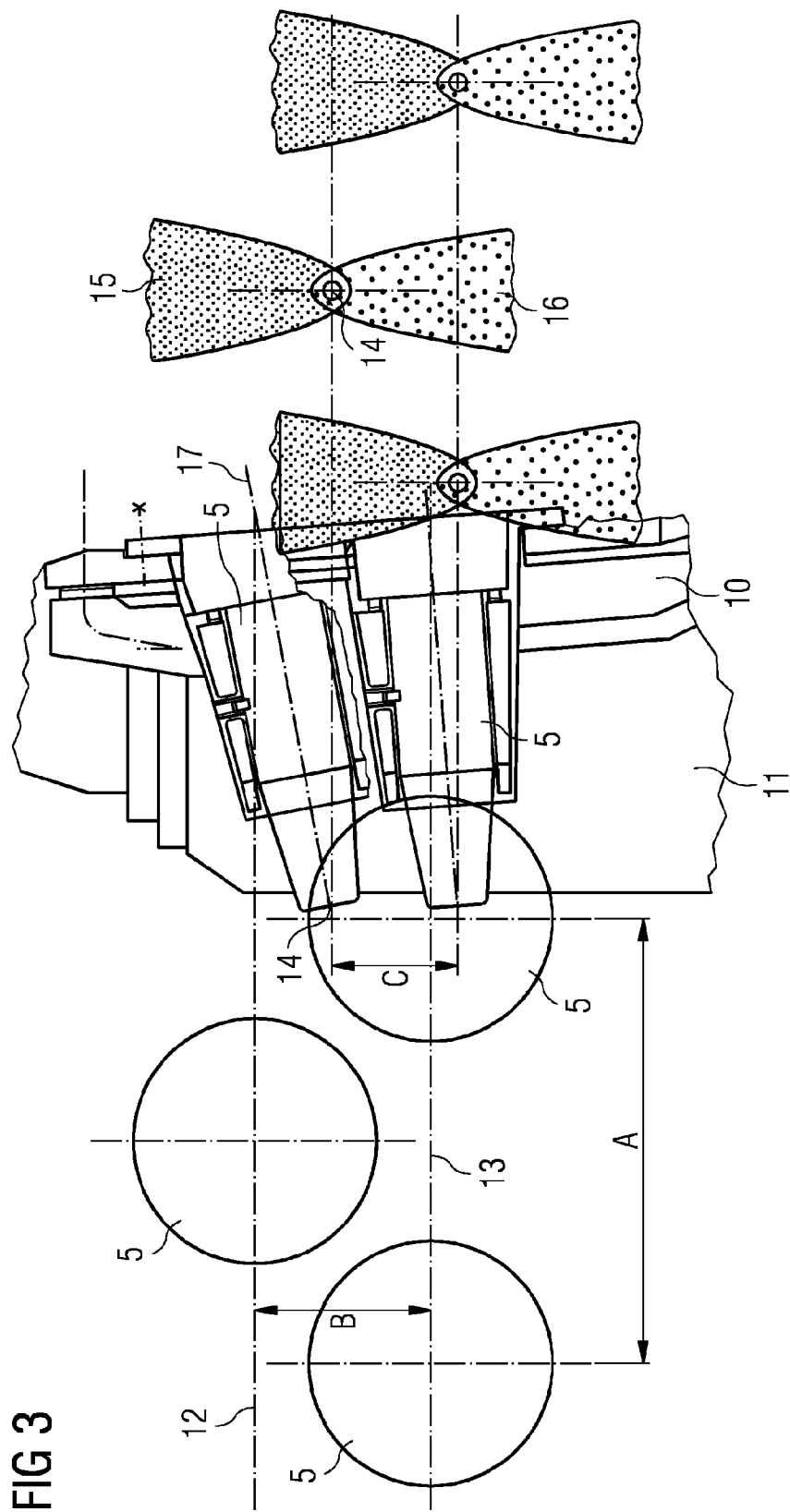
FIG. 3 are a schematic representation of the arrangement of nozzles and of the substance flows.

This is schematically represented in FIG. 3. A possible arrangement of the oxygen nozzles at the periphery of the shell 10 of the melter-gasifier 1 is shown schematically. FIG. 3A shows a group of oxygen nozzles is arranged at each of the nozzle planes 12 and 13. It is herein suitable to arrange the oxygen nozzles evenly distributed over the periphery of the shell 10 as also shown in FIG. 3A. The number of oxygen nozzles is essentially determined by the periphery or the diameter of the melter-gasifier 1 and the desired pig iron production quantity. The spacing A between two oxygen nozzles in one nozzle plane in FIG. 3A is selected such that the number of oxygen nozzles in the two nozzle planes 12 and 13 is maximized, wherein the spacing B between the nozzle planes 12 and 13 in FIG. 3A is kept as small as possible in order to prevent mutual interference or damage of the oxygen nozzles. Typically, the spacing B is selected to be smaller than the spacing A.

Referring to FIG. 3B, in order to achieve fault-free operation, of primary importance is the spacing C between the nozzle tips 14, that is, the vertical spacing between the exit openings of the oxygen nozzles 5 of two nozzle planes in the interior of the melting reduction assembly.

With the inventive arrangement of the oxygen nozzles 5, in FIGS. 3A and 3B a significantly greater number can be realized without having to accept disadvantages with regard to the operation of the oxygen nozzles or the system availability. It is also advantageous that the nozzle supports can be mounted more easily at the shell 10 of the melter-gasifier 1 so that less complex and more economical nozzle mounting devices or nozzle supports can be realized.

The axes 17 of the oxygen nozzles 5 in FIG. 3B are configured inclined relative to the horizontal. The inclination angles of the axes of a nozzle plane can be configured to be different, although often a uniform inclination angle is selected for all the oxygen nozzles of one nozzle plane. The inclination angles of the axes of the oxygen nozzles of a nozzle plane arranged thereabove is advantageously configured greater than that of a nozzle plane laying therebelow. What is thereby achieved is that the exit openings of the oxygen nozzles 5 lie close to one another.

The oxygen and, optionally, fine coal fed in pass via the nozzle tips 14 into the processing chamber of the melter-gasifier, wherein for each oxygen nozzle 5, an essentially upwardly directed gas stream 15 and a downwardly directed pig iron and slag flow 16 is generated as in FIG. 3C. These streams/flows are schematically represented in FIG. 3C, wherein it is apparent that said streams/flows do not touch or meet other oxygen nozzles arranged thereabove or therebelow. Said streams/flows also do not overlap one another. The number of nozzle planes is selected and/or maximized according to the required melt output and can also be increased to 3 or more nozzle planes.

The invention claimed is:

1. A melting reduction assembly comprising;
   an enclosure defined by a shell,
   loading devices for loading solid carbon carriers and ferrous input materials in the enclosure;
   a melting gasification zone in the enclosure and which comprises a packed bed formed by the solid carbon carriers and the ferrous input materials, the melting gasification zone having a lower section for receiving liquid pig iron or raw steel material and liquid slag and having a tap for outlet of liquid slag and liquid pig iron;
   a plurality of oxygen nozzles arranged in the shell of the melting reduction assembly, and a plurality of supply lines for feeding oxygen-containing gas or oxygen to the oxygen nozzles, the oxygen nozzles having outlets, the oxygen nozzles being in a ring circuit which surrounds the shell of the melting reduction assembly in a ring form, the plurality of oxygen nozzles are arranged distributed in at least two parallel nozzle planes arranged spaced apart from one another in a vertical direction, the nozzles being horizontally distributed around the periphery of the shell in the at least two nozzle planes; the nozzles are arranged offset to one another, wherein the vertical spacing between the nozzle planes at the vertical spacing between the exit openings of the oxygen nozzles is smaller than, or at most equal to, the horizontal spacing between the oxygen nozzles, the oxygen nozzles blowing oxygen into the packed bed.

2. The melting reduction assembly as claimed in claim 1, wherein one of the oxygen nozzles has an inclination angle relative to the horizontal and directed downwardly.

3. The melting reduction assembly as claimed in claim 1, wherein at least two of the oxygen nozzles, which are arranged in two different ones of the nozzle planes have different, downwardly directed, inclinations of the respective nozzle axes.

4. The melting reduction assembly as claimed in claim 1, wherein at least one of the oxygen nozzles in a first one of the nozzle planes has a smaller inclination of the nozzle axis relative to the horizontal than a larger inclination of the nozzle axis relative to the horizontal of at least one of the oxygen nozzles of second one of the nozzle planes lying above the first plane.

5. The melting reduction assembly as claimed in claim 1, wherein all of the oxygen nozzles in one nozzle plane have the same, downwardly directed inclination of the respective nozzle axis thereof, relative to the horizontal.

6. The melting reduction assembly as claimed in claim 1, wherein all of the oxygen nozzles are arranged such that a gas stream and/or a fluid flow either emerging from each of the oxygen nozzles or formed by the oxygen do not overlap one another.

7. The melting reduction assembly as claimed in claim 1, wherein each of the nozzles has a nozzle tip; the arrangement of the nozzles in at least two of the nozzle planes and the respective inclinations of the nozzle axes in the at least two nozzle planes is selected to define a minimum vertical spacing between the nozzle outlets in the at least two planes in the enclosure of the melting reduction assembly.

8. A method for operating a melting reduction assembly, wherein ferrous input materials which have been at most fully reduced by the addition of solid carbon carriers and by the supply of an oxygen-containing gas or of oxygen via a plurality of oxygen nozzles, which are arranged distributed around the periphery of the melting reduction assembly, in a packed bed formed of solid carbon carriers, and have been melted, with simultaneous formation of a reducing gas containing CO and $H_2$, to liquid pig iron or raw steel material;
   the method comprising:
   feeding the oxygen-containing gas via gas lines to the oxygen nozzles which blow the oxygen-containing gas into the packed bed,
   wherein the nozzles are situated in at least two nozzle planes arranged spaced apart from one another in the vertical direction, and the planes are arranged parallel to one another, and the nozzles are horizontally distributed around the periphery of the shell of the melting reduction assembly and wherein the nozzles in each of the different nozzle planes are arranged horizontally offset relative to the nozzles in an adjacent nozzle plane; and setting the vertical spacing between the nozzle planes, at exit openings from the oxygen nozzles smaller than, to at most equal to, the horizontal spacing between the oxygen nozzles.

9. The method as claimed in claim 8, further comprising setting the gas streams and/or fluid flows emerging from the nozzles and the gas streams and/or fluid flows formed by the oxygen-containing gas or the oxygen so as to not overlap one another.

10. The method as claimed in claim 8, further comprising setting the quantity of oxygen introduced via the nozzles arranged in at least two nozzle planes such that the gas streams and/or fluid flows which form due to the introduction of oxygen do not make contact with any nozzles, wherein the gas stream of an upper nozzle plane deflects the gas stream of a lower nozzle plane more strongly toward the center of the melting reduction assembly such that the active cross-section of the packed bed is thereby increased.

11. The melting reduction assembly of claim 1, wherein the vertical spacing between the exit openings of the oxygen nozzles is smaller than, or at most equal to, the horizontal spacing between the oxygen nozzles in one nozzle plane.

12. The melting reduction assembly of claim 2, wherein the inclination angle is in the range of 0° to 25°.

13. The melting reduction assembly of claim 4, wherein the nozzle in the first one of the planes has an inclination of the nozzle axis in the range of 0° to 15° and the nozzle in the second one of the planes has an inclination of the nozzle axis in the range of 0° to 25°.

* * * * *